(12) United States Patent
Shikii et al.

(10) Patent No.: US 7,697,577 B2
(45) Date of Patent: Apr. 13, 2010

(54) WAVELENGTH CONVERSION APPARATUS AND TWO-DIMENSIONAL IMAGE DISPLAY APPARATUS

(75) Inventors: Shinichi Shikii, Nara (JP); Hiroyuki Furuya, Nara (JP); Kiminori Mizuuchi, Osaka (JP); Tatsuo Itoh, Osaka (JP); Kazuhisa Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 143 days.

(21) Appl. No.: 11/812,011

(22) Filed: Jun. 14, 2007

(65) Prior Publication Data

US 2007/0297463 A1  Dec. 27, 2007

(30) Foreign Application Priority Data

Jun. 23, 2006  (JP) ............................. 2006-173499

(51) Int. Cl.
  *H01S 3/30*  (2006.01)
  *H01S 3/10*  (2006.01)
(52) U.S. Cl. ............................. 372/22; 372/6
(58) Field of Classification Search ............. 372/6, 372/22
  See application file for complete search history.

(56) References Cited

U.S. PATENT DOCUMENTS

2002/0001322 A1* 1/2002 Yamamoto et al. ............ 372/22

FOREIGN PATENT DOCUMENTS

JP  2006-019603   1/2006
JP  2006019603 A * 1/2006

* cited by examiner

*Primary Examiner*—Minsun Harvey
*Assistant Examiner*—Patrick Stafford
(74) *Attorney, Agent, or Firm*—Wenderoth, Lind & Ponack, L.L.P.

(57) ABSTRACT

A wavelength conversion apparatus capable of stably providing high output harmonic laser light is provided. The wavelength conversion apparatus comprises an end pump fiber laser 3 containing a laser activating substance, and including a reflecting surface at one end thereof and a fiber grating in the vicinity of the reflecting surface; an excitation laser light source 1 for outputting excitation laser light; an excitation laser light introduction section 4 for introducing the excitation laser light from the excitation laser light source to the fiber laser; a wavelength conversion element 5 for converting a fundamental wave generated by the fiber laser to a harmonic; and a rear reflecting surface 6 located outside the fiber laser and forming a laser cavity together with the fiber grating.

10 Claims, 13 Drawing Sheets

US 7,697,577 B2

WAVELENGTH CONVERSION APPARATUS AND TWO-DIMENSIONAL IMAGE DISPLAY APPARATUS

BACKGROUND OF THE INVENTION

1. Field of the Invention

The present invention relates to a wavelength conversion apparatus and a two-dimensional image display apparatus, and more specifically to a wavelength conversion apparatus capable of stably providing high output harmonic laser light by a combination of a fiber laser and a wavelength conversion element, and a two-dimensional image display apparatus using the same.

2. Description of the Background Art

A visible-light source providing a high, strongly monochromatic output of class W is necessary to realize large displays, high luminance displays and the like. For a red light source among RGB (red, green and blue) light sources, a red high output semiconductor laser used in DVD recorders and the like is usable as a highly productive compact light source. However, it is difficult to realize green and blue light sources with a semiconductor laser. A highly productive compact light source is demanded for these colors.

For a green or blue light source, a wavelength conversion apparatus obtained by combining a fiber laser and a wavelength conversion element is conventionally realized as a low output visible-light source. Such a wavelength conversion apparatus uses a semiconductor laser as a light source of excitation light for exciting a fiber laser and uses a nonlinear optical crystal as a wavelength conversion element.

FIG. 10 schematically shows a structure of a conventional wavelength conversion apparatus. In this example, green output light is obtained using the wavelength conversion apparatus shown in FIG. 10. As shown in FIG. 10, the conventional wavelength conversion apparatus includes a fiber laser 40 for outputting a fundamental wave, a wavelength conversion element 41 for converting the fundamental wave to green laser light, and a lens 42 for collecting the fundamental wave on an end surface of the wavelength conversion element 41.

First, a basic operation of the fiber laser 40 will be described. Excitation light (excitation laser light) output from an excitation laser light source 43 is incident on a fiber 44 from an end 44 thereof. The excitation light incident on the fiber 44 is absorbed by a laser activating substance contained in the fiber 44 and then converted to seed light of the fundamental wave inside the fiber 44. The seed light of the fundamental wave is repeatedly reciprocated in a laser cavity. The laser cavity includes a fiber grating 44b formed in the fiber 44 and a fiber grating 45b formed in a fiber 45 as a pair of reflecting mirrors, and the seed light is reflected by, and reciprocated between, the fiber grating 44b and the fiber grating 45b. Concurrently, the seed light of the fundamental wave is amplified by a gain provided by the laser activating substance contained in the fiber 44. Thus, the light intensity is increased and also wavelength selection is performed. As a result, laser oscillation occurs. The fiber 44 and the fiber 45 are connected to each other at a connection section 46. The excitation laser light source 43 is current-driven by an excitation laser light current source 47.

The fundamental wave which is output from the fiber laser 40 is incident on the wavelength conversion element 41 via the lens 42, and is converted into a harmonic by a nonlinear optical effect of the wavelength conversion element 41. The obtained harmonic is partially reflected by a beam splitter 48, but the rest of the harmonic is transmitted through the beam splitter 48 and becomes green laser light. This green laser light is the output light from the wavelength conversion apparatus.

The part of the harmonic reflected by the beam splitter 48 is received by a receiving element 49 for monitoring the output light from the wavelength conversion apparatus and converted into an electric signal to be used. An output control section 50 controls the excitation laser light current source 47 such that the electric signal obtained by the receiving element 49 has a desired strength, and thus adjusts the driving current of the excitation laser light source 43. In this manner, the conventional wavelength conversion apparatus adjusts the intensity of the excitation light which is output from the excitation laser light source 43 and also adjusts the intensity of the fundamental wave which is output from the fiber laser 40, and thus can provide stable output light.

As another light source, for example, Japanese Laid-Open Patent Publication No. 2006-19603 (hereinafter, referred to as "patent document 1") proposes a wavelength conversion apparatus capable of stably providing output light by fixing the wavelength of the fundamental wave. FIG. 11 schematically shows a structure of the conventional wavelength conversion apparatus described in patent document 1. Referring to FIG. 11, a reflecting film is provided on one end surface of a laser medium 51, and a reflection preventing film is provided on an outgoing end of the laser medium 51. A fundamental wave which is output from the laser medium 51 is collected inside a wavelength conversion element 53 by a lens 56, and a part of the collected fundamental wave is wavelength-converted and output as a harmonic. The fundamental wave and the harmonic output from the wavelength conversion element 53 are collected on a surface of a wavelength selection mirror 55 by a lens 57. The wavelength selection mirror 55 reflects the fundamental wave and transmits the harmonic. The fundamental wave selectively reflected by the wavelength selection mirror 55 is fed back to the laser medium 51 via the opposite path. In this manner, the oscillation wavelength of the laser medium 51 can be fixed to the wavelength of the fed-back light. Namely, the conventional wavelength conversion apparatus can automatically fix the oscillation wavelength of the laser medium 51 to the phase-matching wavelength of the wavelength conversion element 53 and thus can provide stable output light.

The conventional wavelength conversion apparatuses shown in FIG. 10 and FIG. 11 are capable of stably providing relatively low output harmonic laser light, but have a problem of not capable of easily providing high output harmonic laser light of class W.

In addition, the conventional wavelength conversion apparatuses shown in FIG. 10 and FIG. 11 occasionally cause the following phenomenon. When $LiNbO_3$ or $LiTaO_3$ with a polarized inversion structure is used for the wavelength conversion element 41 or 53, a third harmonic is generated in addition to a second harmonic due to the large nonlinear optical constant of the wavelength conversion element 41 or 53, and the third harmonic causes the second harmonic to be absorbed. Therefore, in the case where a fundamental wave of a certain power density and a second harmonic both exist, the temperature rises on and in the vicinity of an outgoing surface of the wavelength conversion element 41 or 53. This causes a problem that the phase-matching condition is destroyed (i.e., thermal dephasing occurs) and as a result, the light emitting efficiency is lowered.

SUMMARY OF THE INVENTION

Therefore, an object of the present invention for solving the above-described problems is to provide a wavelength conversion apparatus capable of stably providing high output harmonic laser light and a two-dimensional image display apparatus using the same.

The present invention is directed to a wavelength conversion apparatus. For achieving the above object, the wavelength conversion apparatus according to the present invention comprises an end pump fiber laser containing a laser activating substance, and including a reflecting surface at one end thereof and a fiber grating in the vicinity of the reflecting surface; an excitation laser light source for outputting excitation laser light; an excitation laser light introduction section for introducing the excitation laser light from the excitation laser light source to the fiber laser from an end surface of the fiber laser opposite to the reflecting surface; a wavelength conversion element for converting a fundamental wave generated by the fiber laser to a harmonic; and a rear reflecting surface located outside the fiber laser and forming a laser cavity together with the fiber grating. The wavelength conversion element is located between the fiber grating and the rear reflecting surface.

Owing to this, the wavelength conversion apparatus allows the fundamental wave on the forward path and the return path to contribute to the generation of a harmonic. Since the harmonic can be output both from the forward path and the return path, the light amount which causes thermal dephasing when being output from only the forward path can be output as a total light amount of an output from the forward path and an output from the return path without causing thermal dephasing.

Preferably, the rear reflecting surface has a wavelength selection function of reflecting the fundamental wave generated by the fiber laser and transmitting the harmonic generated by the wavelength conversion element; and the reflecting surface at the end of the fiber laser reflects both the excitation laser light and the harmonic. Owing to this, the wavelength conversion apparatus can output the harmonic at a higher efficiency.

The wavelength conversion apparatus further comprises a harmonic output section between an outgoing end surface of the fiber laser and the wavelength conversion element. The harmonic output section outputs the harmonic generated from the fundamental wave reflected by the rear reflecting surface. Owing to this, the wavelength conversion apparatus can output the harmonic generated on the return path even without returning the harmonic to the fiber laser.

The harmonic output section may be a coating for reflecting the harmonic, which is provided on an end surface of the wavelength conversion element closer to the fiber laser; or a coating for reflecting the harmonic, which is provided on the excitation laser light introduction section.

The rear reflecting surface is a dichroic mirror and is adjustable to rotate around an X axis and a Y axis where a Z axis is in an optical axis direction. Alternatively, the rear reflecting surface may be a coating provided on an incidence end surface of a fiber for collecting the harmonic generated by the wavelength conversion element, and the incidence end surface of the fiber may be adjustable to rotate around an X axis and a Y axis where a Z axis is in an optical axis direction. Owing to this, the wavelength conversion apparatus can easily adjust the rear reflecting surface.

It is desirable that an outgoing end surface of the fiber laser is cut such that a propagation direction of the fundamental wave going out from the fiber laser forms a Brewster's angle with respect to a direction vertical to the outgoing end surface of the fiber laser. Owing to this, the wavelength conversion apparatus can provide single polarization as the fundamental wave going out from the fiber laser. In this case, a single-mode fiber with no polarization-maintaining function is usable as the fiber laser, and thus the wavelength conversion apparatus can be structured at low cost.

The present invention is also directed to a two-dimensional image display apparatus. The two-dimensional image display apparatus comprises a screen; and a plurality of laser light sources. The laser light sources respectively emit at least red light, green light and blue light. Either one of the above-described wavelength conversion apparatuses is used as at least the light source for emitting the green light among the laser light sources.

Owing to this, the two-dimensional image display apparatus can generate an output from the green light source at a high efficiency and thus provide a high luminance image. Such an increase in the output can provide, for example, the following effects. The fiber laser may be shortened to reduce the cost, or the light amount of the excitation light source may be decreased to reduce the power consumption.

As described above, the wavelength conversion apparatus according to the present invention includes a wavelength conversion element located in the laser cavity including the fiber grating and the rear reflecting surface, so as to cause the fundamental wave both on the forward path and the return path to contribute to the generation of a harmonic. In addition, since the harmonic can be output both from the forward path and the return path, the light amount which causes thermal dephasing when being output from only the forward path can be output as a total light amount of an output from the forward path and an output from the return path without causing thermal dephasing. As a result, a high output harmonic can be provided stably.

These and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, embodiments of the present invention will be described with reference to the drawings.

First Embodiment

Figure 1:
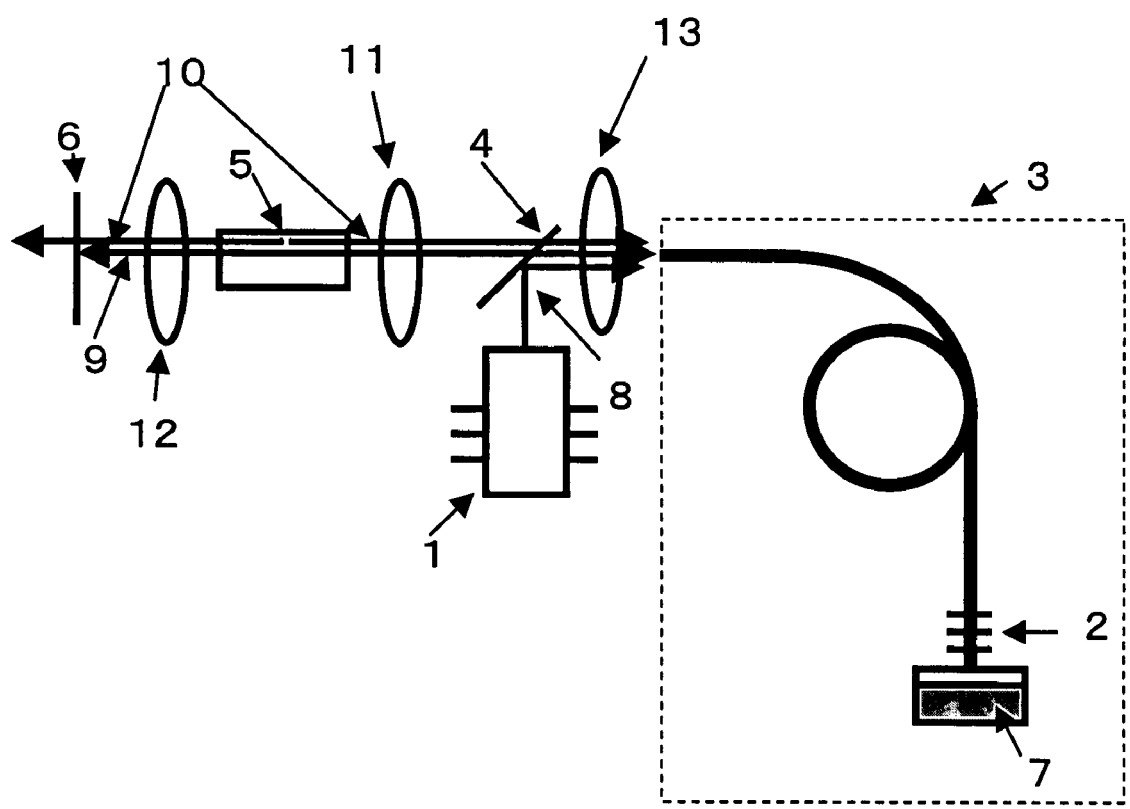
FIG. 1 is a block diagram showing an exemplary structure of a wavelength conversion apparatus according to a first embodiment of the present invention.

FIG. 1 is a block diagram showing an exemplary structure of a wavelength conversion apparatus according to a first embodiment of the present invention. As shown in FIG. 1, the wavelength conversion apparatus includes an excitation light source 1, an end pump fiber laser 3 (hereinafter, referred to simply as the "fiber laser 3"), an excitation laser light introduction section 4, a wavelength conversion element 5, a rear reflecting surface 6, a collection lens 11, a collection lens 12, and a collimator lens 13. The fiber laser 3 contains a laser activating substance, and includes a fiber grating 2 for reflecting a fundamental wave 9 and a reflecting surface 7 for reflecting excitation laser light 8 at an end of the fiber.

The excitation laser light 8 which is emitted from an excitation light source 1 is reflected by the excitation laser light introduction section 4 and introduced to the fiber laser 3 via the collimator lens 13. The excitation laser light introduction section 4 is located between the excitation light source 1 and the fiber laser 3 and acts to introduce the excitation laser light 8 to the fiber laser 3. The excitation laser light 8 introduced to the fiber laser 3 is propagated in the fiber laser 3 while being absorbed by the laser activating substance. After passing through the fiber grating 2, the excitation laser light 8 is reflected by the reflecting surface 7 at the end of the fiber and is propagated in the opposite direction while being absorbed by the laser activating substance. The excitation laser light 8 is absorbed by the laser activating substance and extinguished almost entirely before reciprocating once in the fiber laser 3 and going out from the fiber laser 3.

The seed light of the fundamental wave generated during this period is amplified by the excitation laser light 8 while reciprocating in a laser cavity including the fiber grating 2 and the rear reflecting surface 6, and thus causes laser oscillation as a high output fundamental wave. In this laser cavity, the fiber grating 2 is provided at one end of the cavity. Owing to this structure, it becomes possible to select any desired central reflection wavelength and to select any desired central oscillation wavelength. It also becomes possible to generate a fundamental wave of a narrow band of 0.05 to 0.2 nm. If the fiber grating 2 is formed of a reflecting mirror such as a dielectric multi-layer film or the like, it is difficult to generate a fundamental wave of this level of narrow band. In this case, it is also difficult to cause laser oscillation at a desired wavelength because the oscillation occurs at a high gain wavelength, at which the oscillation occurs easily. The wavelength conversion element 5 is located in the cavity including the fiber grating 2 and the rear reflecting surface 6.

Next, a function of the wavelength conversion element 5 will be described. The fundamental wave 9 going out from the fiber laser 3 as described above (i.e., the fundamental wave on the forward path) is collimated by the collimator lens 13, then collected by the collection lens 11, and incident on the wavelength conversion element 5. The fundamental wave 9 is partially converted by the nonlinear optical effect of the wavelength conversion element 5 and is output as a harmonic 10 having a wavelength which is ½ of that of the fundamental wave 9. The harmonic 10 output from the wavelength conversion element 5 is generally collimated by the collection lens 12 and transmitted through the rear reflecting surface 6 to be taken outside. This harmonic 10 is output from the wavelength conversion apparatus as harmonic laser light. The fundamental wave 9 transmitted through the wavelength conversion element 5 without being used for the wavelength conversion is also generally collimated by the collection lens 12 and is reflected by the rear reflecting surface 6 to be returned on the same path.

The fundamental wave 9 reflected by the rear reflecting surface 6 (i.e., the fundamental wave on the return path) proceeds on exactly the same path as taken from the fiber laser 3, in the opposite direction; i.e., is transmitted through the collection lens 12 and is incident on the wavelength conversion element 5 to contribute to the generation of a harmonic. The fundamental wave 9 which is transmitted through the wavelength conversion element 5 still proceeds on the same path as taken from the fiber laser 3, in the opposite direction; i.e., is transmitted through the collection lens 11, the excitation laser light introduction section 4 and the collimator lens 13 to return to the fiber laser 3 and thus contribute to the generation of the laser oscillation of the fundamental wave. In a solid-state laser such as YAG laser or the like, the reflecting surface provided at an end of the laser medium included in the laser cavity is usually required to have a reflectance close to 100%. In the laser fiber, by contrast, stable laser oscillation is obtained even with a reflectance of as low as about 20% at an outgoing end of the fiber. Therefore, it is made possible to provide the wavelength conversion element 5 inside the laser cavity as in the present invention.

As the wavelength conversion element 5, an SHG element formed of a nonlinear optical crystal having a periodical polarized inversion structure is preferable. Available as the SHG element having a periodical polarized inversion structure are, for example, $KTiOPO_4$, $LiNbO_3$, $LiTaO_3$, Mg-doped $LiNbO_3$ or $LiTaO_3$, or stoichio $LiNbO_3$ or $LiTaO_3$. The crystals of these materials have a high nonlinear constant and therefore can be wavelength-converted at a high efficiency. These materials are also advantageous in allowing the phase-matching condition to be freely set by changing the periodical structure.

The harmonic 10 generated inside the wavelength conversion element 5 from the fundamental wave 9, which is reflected by the rear reflecting surface 6 and proceeds on the return path, is again collimated by the collection lens 11, and collected by the collimator lens 13 via the excitation laser light introduction section 4, and incident on the fiber laser 3. The fiber laser 3, in the case of being Yb-doped as described above, absorbs light at an excitation laser wavelength of 915 nm, but is almost transparent to a harmonic of about 530 nm. Therefore, the harmonic 10 is propagated in the fiber laser 3 without being absorbed. In this structure, the reflecting surface 7 for reflecting the excitation light is provided at the end of the fiber. Therefore, the harmonic 10 passes through the fiber grating 2 and then is reflected by the reflecting surface 7 to return. The harmonic 10 reciprocated once in the fiber laser 3 goes out from the fiber laser 3, is collimated by the collimator lens 13, passes through the excitation laser light introduction section 4, and is transmitted through the collection lens 11, the wavelength conversion element 5, the collection lens 12 and the rear reflecting surface 6. Thus, the harmonic 10 can be output from the wavelength conversion apparatus, like the above-described harmonic 10 generated on the forward path.

In this embodiment, the excitation laser light introduction section 4 and the rear reflecting surface 6 may be each formed of a dichroic mirror. In this case, it is preferable that the excitation laser light introduction section 4 is provided with a characteristic of reflecting the excitation laser light 8 and transmitting the fundamental wave 9, and that the rear reflecting surface 6 is provided with a characteristic of reflecting the fundamental wave 9 and transmitting the harmonic 10. Usually, these characteristics can be provided by coating the excitation laser light introduction section 4 and the rear reflecting surface 6 with a dielectric multi-layer film. The reflecting surface 7 at the end of the fiber is preferably provided with a characteristic of reflecting both the excitation laser light 8 and the harmonic 10.

Figure 2:
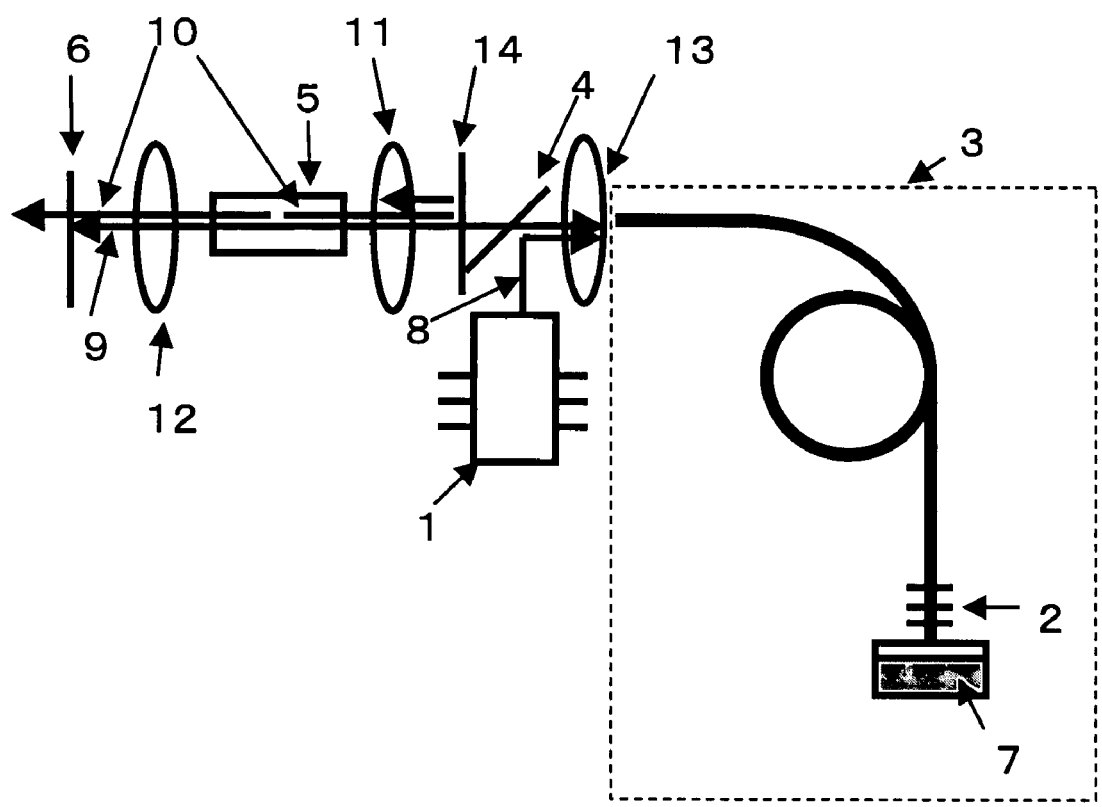
FIG. 2 is a block diagram showing another exemplary structure of the wavelength conversion apparatus according to the first embodiment of the present invention.

As described above, the harmonic 10 generated in the wavelength conversion element 5 from the fundamental wave 9, which is reflected by the rear reflecting surface 6 to be returned on the same path, can be output from the wavelength conversion apparatus by being returned to the fiber laser 3. Alternatively, as shown in FIG. 2, the harmonic 10 may be output from a harmonic output section 14 which is inserted between the fiber laser 3 and the wavelength conversion element 5. In this case, the harmonic output section 14 is provided with a characteristic of transmitting the fundamental wave 9 and reflecting the harmonic 10, and thus the reflected harmonic 10 can be output. Namely, the harmonic 10 reflected by the harmonic output section 14 is output from the wavelength conversion apparatus after passing through the collection lens 11, the wavelength conversion element 5, the collection lens 12, and the rear reflecting surface 6.

Figure 3:
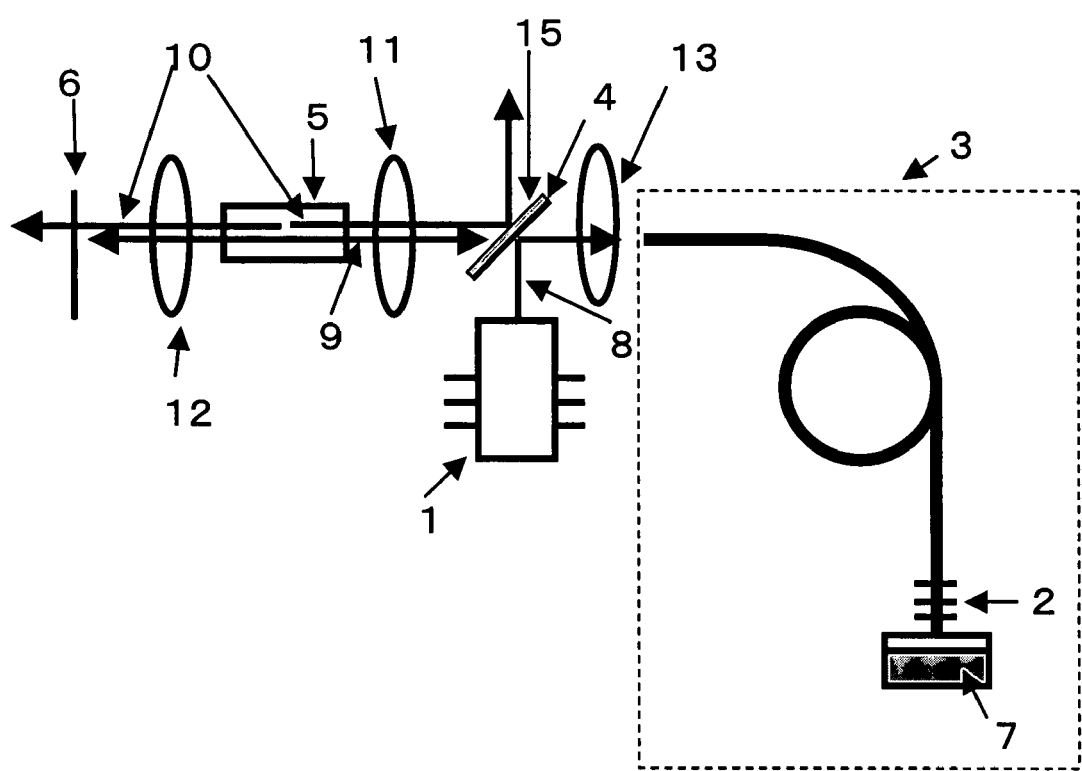
FIG. 3 is a block diagram showing still another exemplary structure of the wavelength conversion apparatus according to the first embodiment of the present invention.

The wavelength conversion apparatus does not need to include the harmonic output section 14 as an additional element. As shown in FIG. 3, the excitation laser light introduction section 4 may be provided with a coating 15 for outputting the harmonic. Thus, the harmonic 10 can be output from the excitation laser light introduction section 4. In the example of FIG. 3, the wavelength conversion apparatus can allow the harmonic 10 to be output from both the rear reflecting surface 6 and the excitation laser light introduction section 4.

Figure 4:
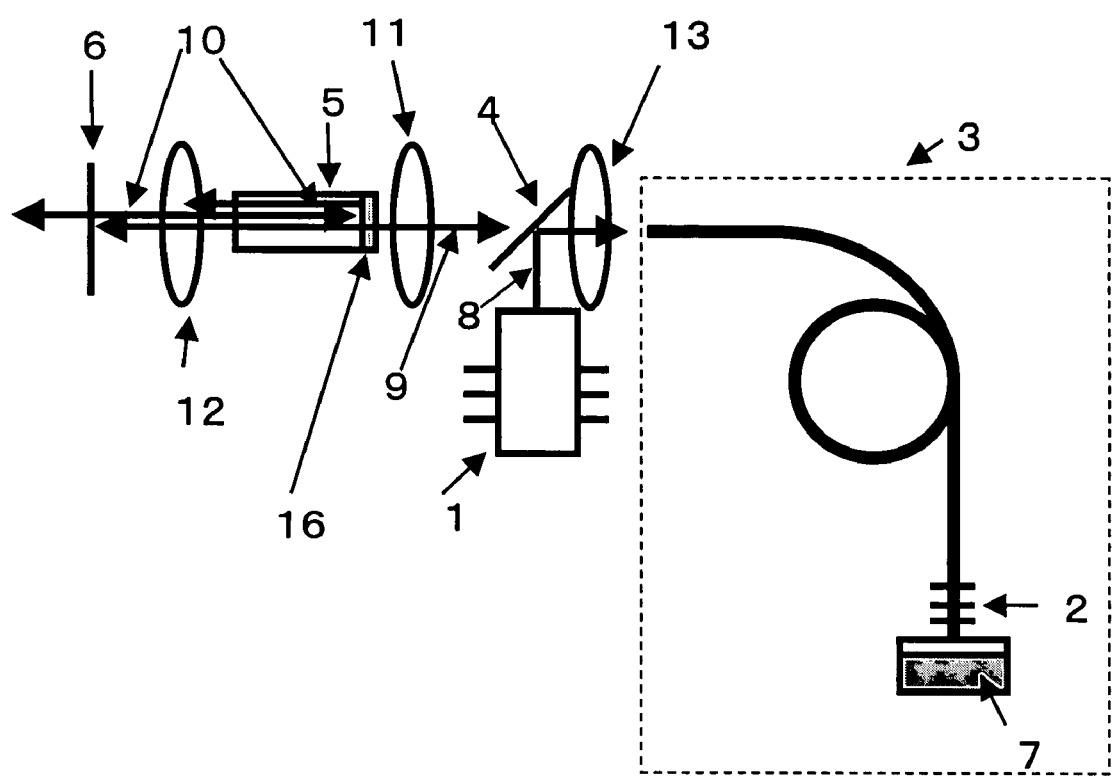
FIG. 4 is a block diagram showing still another exemplary structure of the wavelength conversion apparatus according to the first embodiment of the present invention.

The wavelength conversion apparatus may also allow the harmonic 10 to be output by, as shown in FIG. 4, providing a coating 16, at an end surface of the wavelength conversion element 5 closer to the fiber laser 3, for transmitting the fundamental wave 9 and reflecting the harmonic 10.

In order to return the fundamental wave 9 reflected by the rear reflecting surface 6 to the fiber laser 3, the wavelength conversion apparatus needs to collimate the fundamental wave 9 on the forward path by the collection lens 12, or to form a covalent point with respect to the outgoing end of the fiber laser 3 on the rear reflecting surface 6. In the case where the rear reflecting surface 6 is formed of a dichroic mirror, it is simple to use and preferable to adjust the position of the collection lens 12 such that the fundamental wave 9 is collimated. The reason is that the harmonic 10 is also collected by the collection lens 12.

Figure 5A:
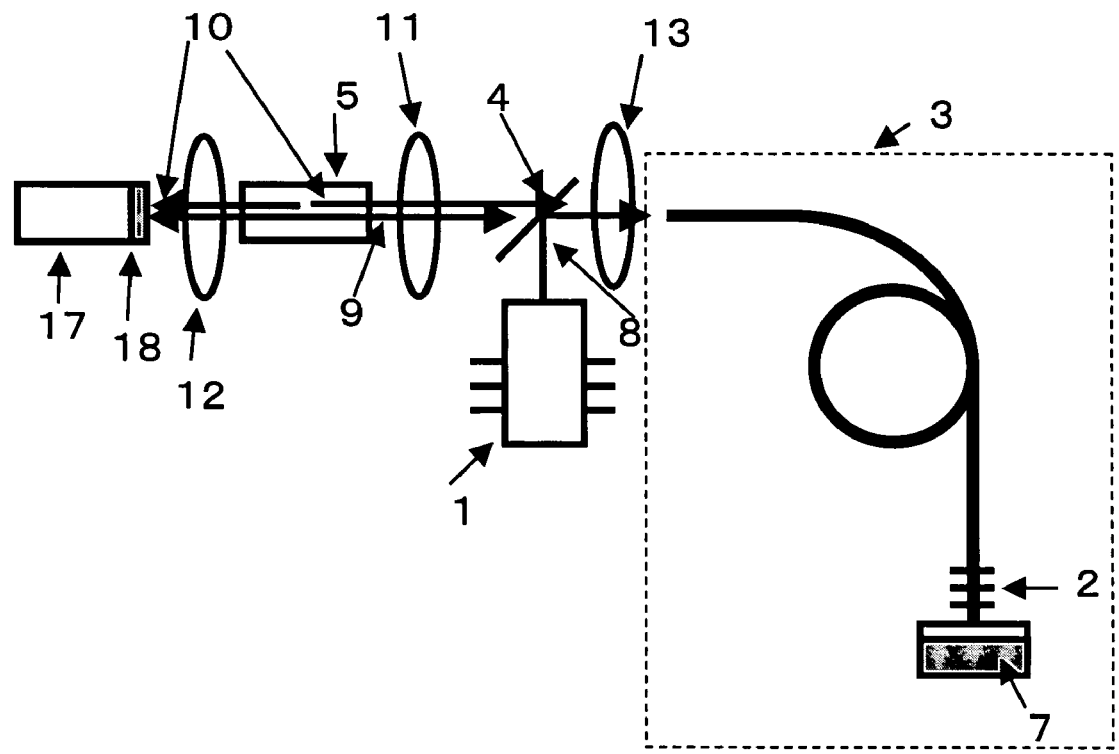
FIG. 5A is a block diagram showing still another exemplary structure of the wavelength conversion apparatus according to the first embodiment of the present invention.
Figure 5B:
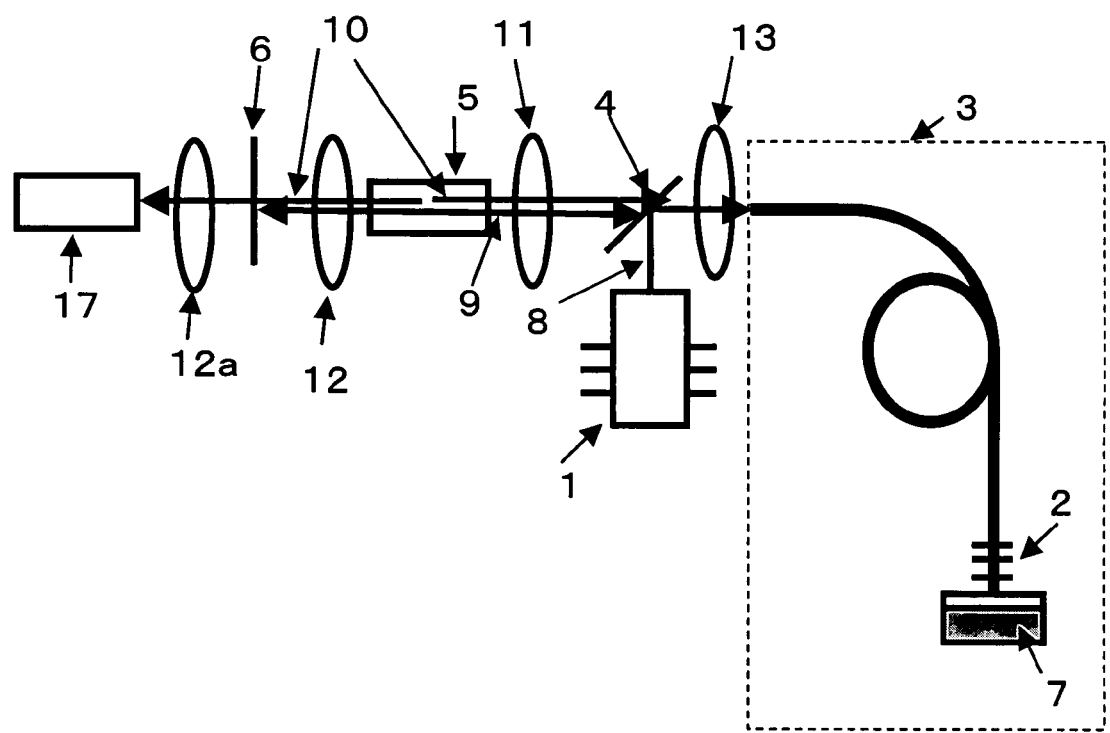
FIG. 5B is a block diagram showing still another exemplary structure of the wavelength conversion apparatus according to the first embodiment of the present invention.

The rear reflecting surface 6 may be formed of a dichroic mirror as described above, but alternatively, as shown in FIG. 5A, the rear reflecting surface 6 may be omitted and the harmonic 10 may be collected by a fiber 17. In this case, an incidence end surface of the fiber 17 may be provided with a coating 18 for reflecting the fundamental wave 9 and transmitting the harmonic 10. In this structure, it is preferable to locate the collection lens 12 such that the harmonic 10 is collected on the incidence end surface of the fiber 17. In any way, the wavelength conversion apparatus is structured such that the fundamental wave 9 reflected by the incidence end surface of the fiber 17 is returned on the same optical path as the forward path, in the opposite direction. As shown in FIG. 5B, the wavelength conversion apparatus may include another collection lens 12a between the rear reflecting surface 6 and the fiber 17, so that the harmonic 10 is collected on the incidence end surface of the fiber 17. In this case, it is not necessary to provide the coating 18 at the incidence end surface of the fiber 17 as shown in FIG. 5A.

In order to efficiently return the fundamental wave 9 reflected by the rear reflecting surface 6 to the fiber laser 3, the wavelength conversion apparatus needs to propagate the fundamental wave 9 from the fiber laser 3 on an optical path as similar as possible to the forward path, in the opposite direction. For realizing this, it is preferable to attach the rear reflecting surface 6 to be rotatable around X and Y axes (where Z axis is in the optical axis direction). Also in the example of FIG. 5A, it is preferable to attach the fiber 17 to be rotatable around the X and Y axes.

Figure 6A:
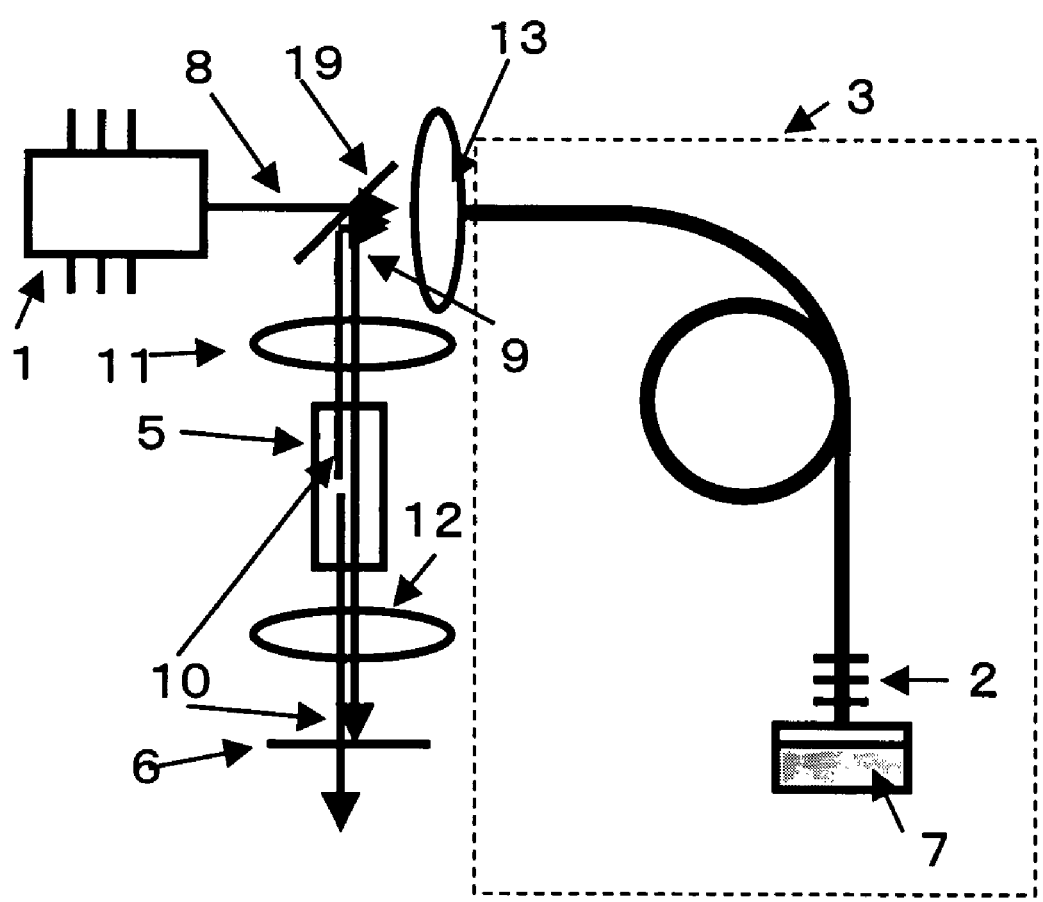
FIG. 6A is a block diagram showing still another exemplary structure of the wavelength conversion apparatus according to the first embodiment of the present invention.

In a wavelength conversion apparatus shown in FIG. 6A, including the same elements as those in FIG. 1, the excitation laser light 8 from the excitation light source 1 is incident on the fiber laser 3 after being transmitted through, not reflected by, an excitation laser light introduction section 19. By contrast, the fundamental wave 9 is reflected by the excitation laser light introduction section 19 and introduced to the wavelength conversion element 5. In order to realize this structure, the excitation laser light introduction section 19 is provided with a coating for transmitting the excitation laser light 8 and reflecting the fundamental wave 9. Owing to this structure, the optical path for returning the fundamental wave 9 and the harmonic 10 to the fiber laser 3 can be adjusted more freely. It is preferable that the excitation laser light introduction section 19 and the rear reflecting surface 6 are adjustable around the X and Y axes where the Z axis is in the optical axis direction. By adjusting the position of the excitation light source 1, the excitation laser light 8 can be incident on the fiber laser 3 efficiently.

Figure 6B:
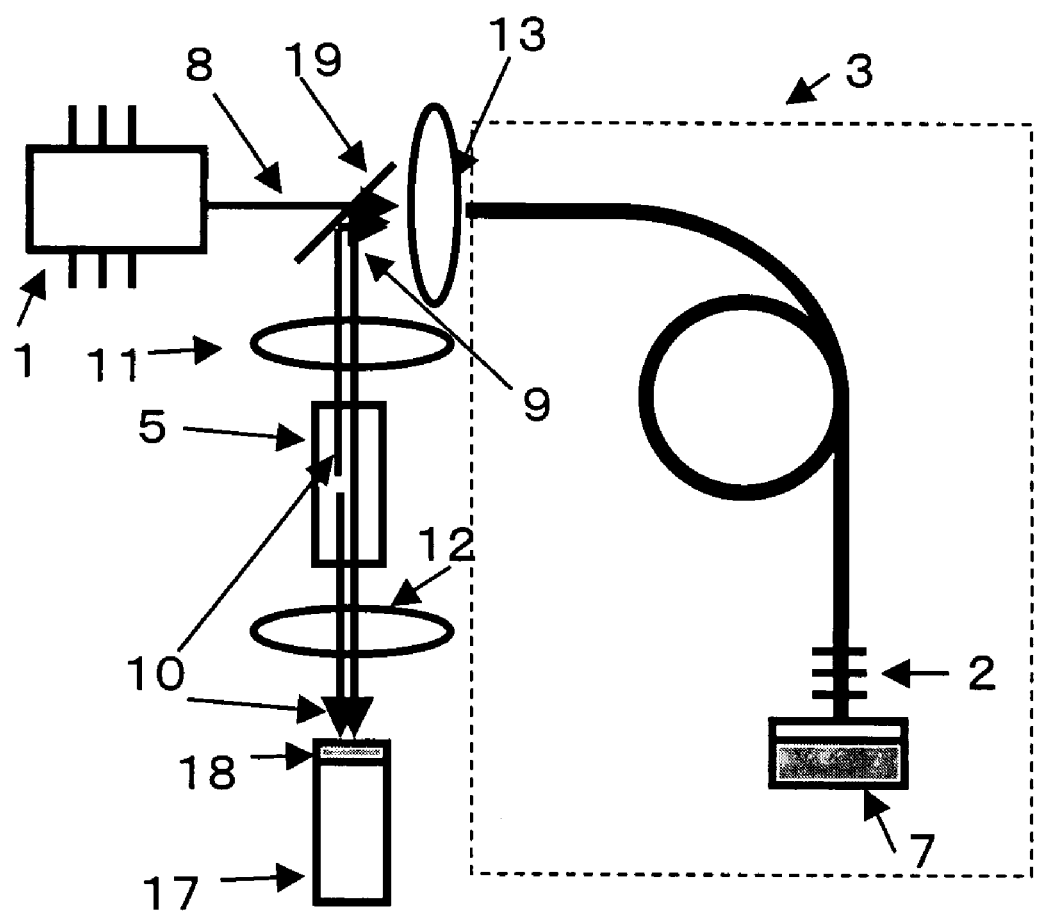
FIG. 6B is a block diagram showing still another exemplary structure of the wavelength conversion apparatus according to the first embodiment of the present invention.

In the example of FIG. 6A, the rear reflecting surface 6 is formed of a dichroic mirror. Alternatively, the structure shown in FIG. 6B may be adopted. In FIG. 6B, the harmonic 10 is collected by the fiber 17, and the incidence end surface of the fiber 17 is provided with the coating 18 for reflecting the fundamental wave 9 and transmitting the harmonic 10. By providing the coating of the excitation laser light introduction section 19 with a characteristic of reflecting the wavelength of the harmonic 10, the efficiency of the harmonic output can be increased.

As described above, the conventional wavelength conversion apparatuses occasionally cause the phenomenon that when $LiNbO_3$ or $LiTaO_3$ with a polarized inversion structure is used for the wavelength conversion element, a third harmonic is generated in addition to a second harmonic due to the large nonlinear optical constant of the wavelength conversion element, and the third harmonic causes the second harmonic to be absorbed. Therefore, in the case where a fundamental wave of a certain power density and a second harmonic both exist, the temperature rises on and in the vicinity of an outgoing surface of the wavelength conversion element. This causes the problem that the phase-matching condition is destroyed (i.e., thermal dephasing occurs) and as a result, the light emitting efficiency is lowered. The wavelength conversion apparatus according to the present invention can output the second harmonic from both the forward path and the return path as described above. Therefore, the light amount which causes thermal dephasing when being output from only the forward path can be output as a total light amount of an output from the forward path and an output from the return path without causing thermal dephasing. As a result, the total light amount of the harmonic laser obtained from the forward path and the return path can be increased.

Specifically, for example, a wavelength conversion apparatus, conventionally capable of outputting light of about 2.8 W from the forward path, can output light of about 2.2 W from the forward path and light of about 1.2 W from the return path without causing thermal dephasing when adopting the structure of the present invention. Light of about 3.4 W is obtained in total. Such an increase in the output can provide, for example, the following effects. The fiber laser 3 may be shortened by the increased amount of light emission to reduce the cost, or the light amount of the excitation light source 1 may be decreased by the increased amount of light emission to reduce the power consumption.

Figure 7:
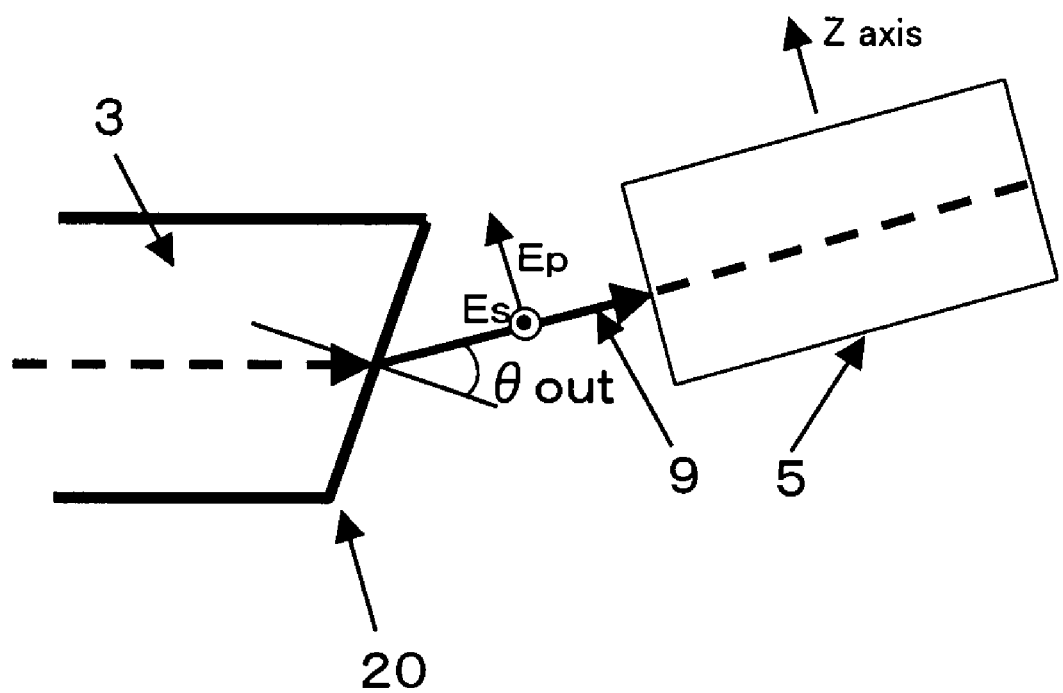
FIG. 7 shows the relationship between an end surface 20 of a fiber laser 3 and an angle of a wavelength conversion element 5.

Now, means for obtaining single polarization as the fundamental wave 9 going out from the fiber laser 3 will be described. FIG. 7 shows the relationship between an end surface 20 of the fiber laser 3 and the angle of the wavelength conversion element 5. In the wavelength conversion element 5 formed of $LiNbO_3$ or the like, the relationship between the crystalline axis at which the wavelength conversion is performed efficiently and the direction of electric field of the incident fundamental wave is generally determined. For example, when the wavelength conversion element 5 is formed of $LiNbO_3$ or the like, in order to raise the output efficiency of the harmonic 10, it is preferable that the fundamental wave 9 going out from the fiber laser 3 is as close as possible to the single polarization and that the polarization direction thereof (the amplitude direction of the electric field) and the Z axis are the same.

Figure 8:
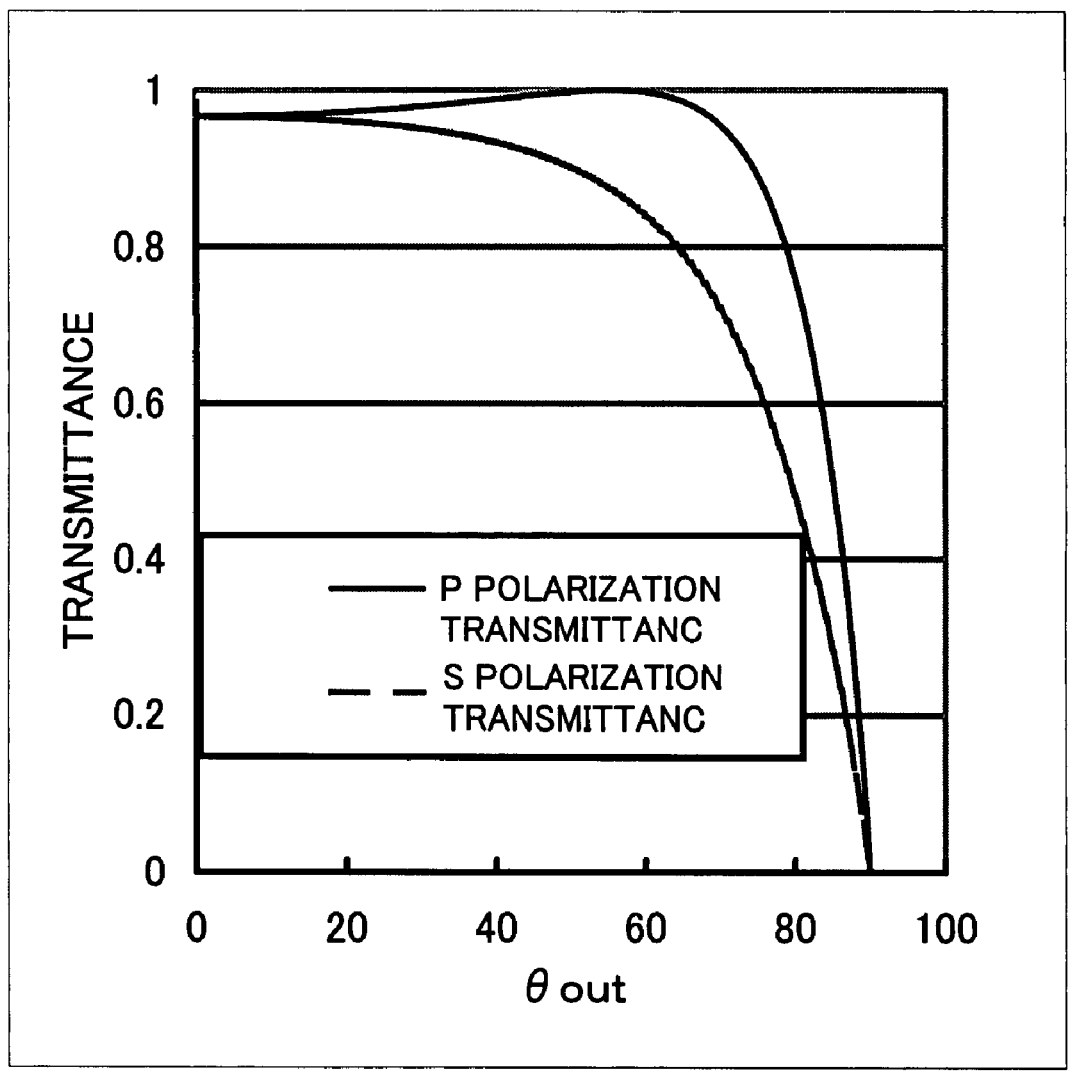
FIG. 8 shows the transmission angle dependence of S polarization and P polarization of a fundamental wave 9 at the end surface 20 of the fiber laser 3.

In order to make the fundamental wave 9 going out from the fiber laser 3 closer to the single polarization, it is conceivable to define the angle θout of the fundamental wave 9 going out from the fiber laser 3. Specifically, the end surface 20 of the fiber laser 3 is cut such that the outgoing angle θout of the fundamental wave 9 with respect to the direction vertical to the end surface 20 of the fiber laser 3 is the Brewster's angle or the vicinity thereof. FIG. 8 shows the transmission angle dependence of S polarization and P polarization of the fundamental wave 9 at the end surface 20 of the fiber laser 3. In this structure, in the case where the outgoing angle θout of the fundamental wave 9 from the fiber laser 3 is set to 55°, almost 100% of a P polarization component of the fundamental wave 9 goes out from the fiber laser 3, where as only about 87% of an S polarization component of the fundamental wave 9 goes out from the fiber laser 3. When the fundamental wave 9 is, for example, reflected by the rear reflecting surface 6 to return toward the fiber laser 3 and is transmitted through the end surface 20 of the fiber laser 3 again, the ratio of the S polarization component going out from the fiber laser 3 is further lowered to about 75%. In this manner, merely by cutting the outgoing surface of the fiber laser 3 to a predetermined angle, the P polarization component can be output at a larger ratio with respect to the S polarization component.

In this embodiment, the polarization is controlled by cutting the end surface 20 of the fiber laser 3 to form the Brewster's angle or the vicinity thereof. The same effect is provided by cutting an end surface of the wavelength conversion element 5, on and from which the fundamental wave 9 is incident and goes out, to form the Brewster's angle or the vicinity thereof. By cutting a plurality of surfaces to form the Brewster's angle or the vicinity thereof, the ratio of the P polarization component with respect to the S polarization component can be increased.

In this case, it is conceived to use, as the fiber laser 3, a double-clad polarization-maintaining fiber capable of propagating the excitation laser light 8 of high output. However, as compared to a single-mode fiber with no polarization-maintaining function (hereinafter, referred to simply as the single-mode fiber), a polarization-maintaining fiber is disadvantageous in being more expensive and lower in propagation efficiency. Now, the reason why the propagation efficiency of the polarization-maintaining fiber is lower will be described. The propagation efficiency of a fiber depends on the structure thereof. For example, a polarization-maintaining fiber such as a PANDA fiber or the like includes a stress application section on both sides of a core with respect to the propagation direction. Owing to such a structure, birefringence is induced in the core by the optical elasticity effect and thus the polarization of the fundamental wave propagating in the core is maintained. However, this stress application section slightly acts as a scattering source of the oscillated fundamental wave on the are a where the fundamental wave is propagated and thus a propagation loss of the fundamental wave is generated. Therefore, the propagation efficiency of the polarization-maintaining fiber is lower than that of the single-mode fiber.

In actuality, when the fiber laser 3 is formed of a polarization-maintaining fiber having the same length as that of the single-mode fiber, the output from the fiber laser 3 with the same structure is lowered due to the lower propagation efficiency, and occasionally laser oscillation does not occur. For example, in the case of a laser oscillating at 1064 nm, the optimum length of the laser is 30 meters when the usual single-mode fiber is used but is shortened to 18 to 20 meters when the propagation-maintaining fiber is used, and the conversion efficiency from the excitation light to the oscillation light is lower by 10 to 15% with the propagation-maintaining fiber than with the single-mode fiber. The data is confirmed by experiments. As described above, however, in the case where the end surface 20 of the fiber laser 30 is cut to form the Brewster's angle or the vicinity thereof to control the direction of the polarization, the single-mode fiber which costs low and provides a high propagation efficiency can be used. Therefore, the fundamental wave 9 is propagated at a high efficiency and as a result, the harmonic is output at a high efficiency.

Thus, in the case where, for example, the wavelength conversion element 5 is formed of $LiNbO_3$ crystal or $LiTaO_3$, the fundamental wave can be converted to the harmonic at a high efficiency by locating the electric field P polarization component Ep of the fundamental wave mainly including the P polarization component in the same direction as the Z axis direction. In the case where wavelength conversion element 5 is formed of $KTiO_4$, the fundamental wave can be converted to the harmonic at a high efficiency by allowing the beam to be incident on the wavelength conversion element 5 at an angle which is 90° with respect to the Z axis of the crystalline axis and 23.5° with respect to the X axis, such that the electric field Ep is 45° with respect to the XY plane. The range of the incident angle θout is designed to be preferably within ±10°, and more preferably within ±5° from the Brewster's angle.

As described above, the wavelength conversion apparatus according to the first embodiment of the present invention includes the wavelength conversion element 5 located in the laser cavity including the fiber grating 2 and the rear reflecting surface 6, so as to cause the fundamental wave both on the forward path and the return path to contribute to the generation of a harmonic and thus increase the efficiency of wavelength conversion. In addition, since the harmonic can be output both from the forward path and the return path, the light amount which causes thermal dephasing when being output from only the forward path can be output as a total light amount of an output from the forward path and an output from the return path without causing thermal dephasing. As a result, a high output harmonic can be provided stably.

Second Embodiment

Figure 9:
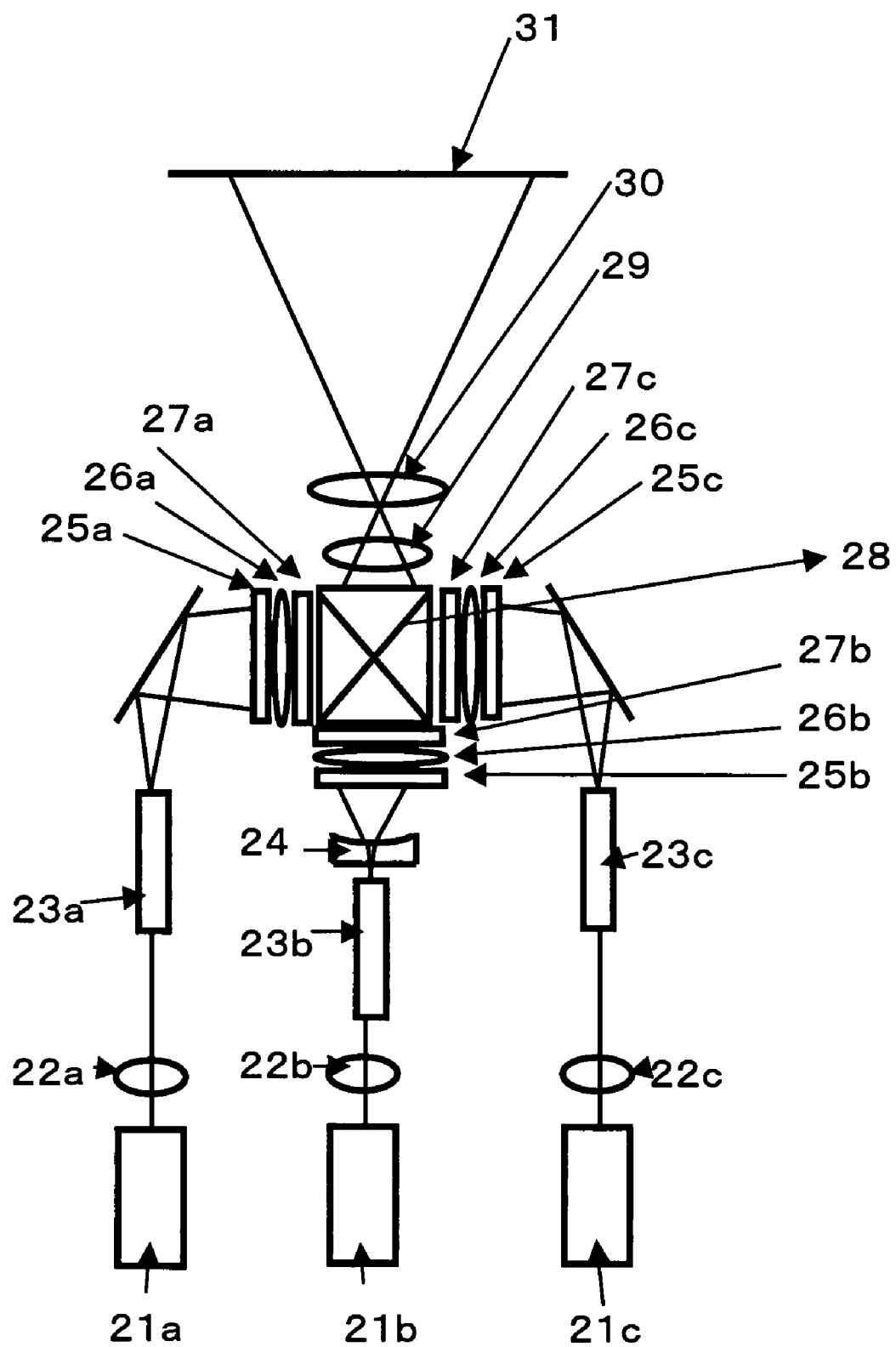
FIG. 9 is a block diagram showing an exemplary schematic structure of a two-dimensional image display apparatus according to a second embodiment of the present invention.
Figure 10:
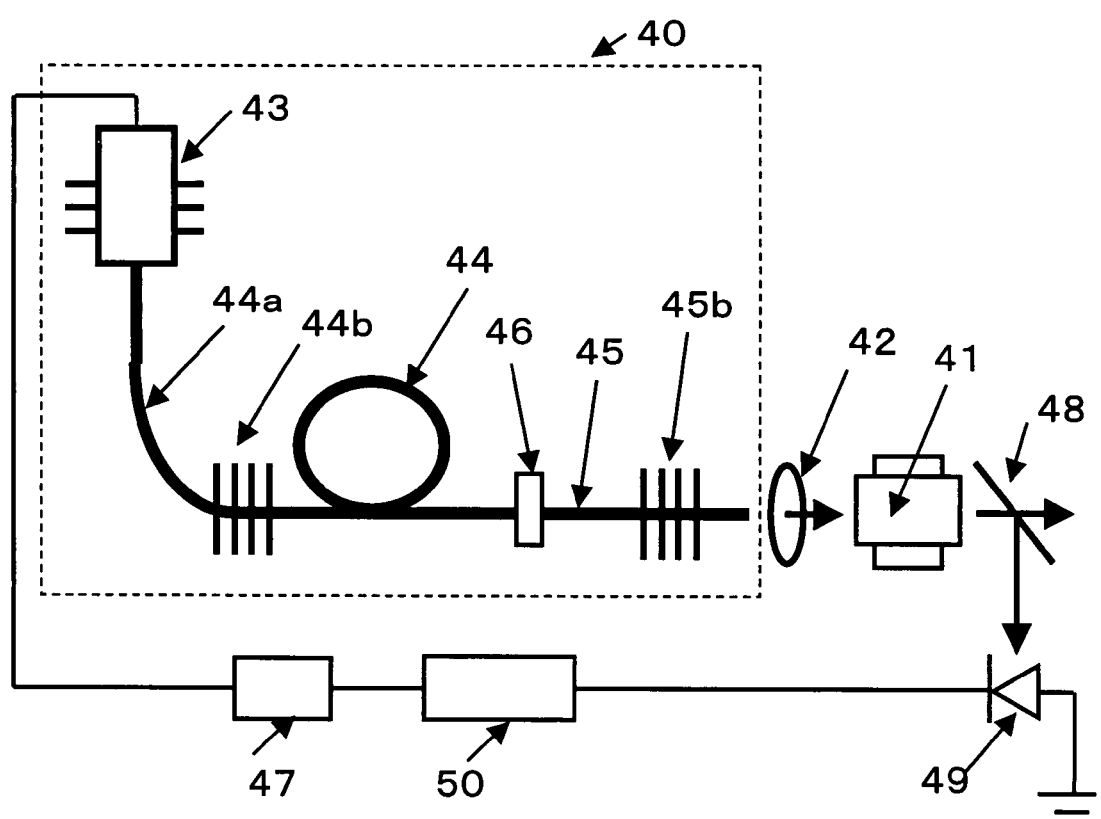
FIG. 10 is a block diagram showing a schematic structure of a conventional wavelength conversion apparatus.
Figure 11:
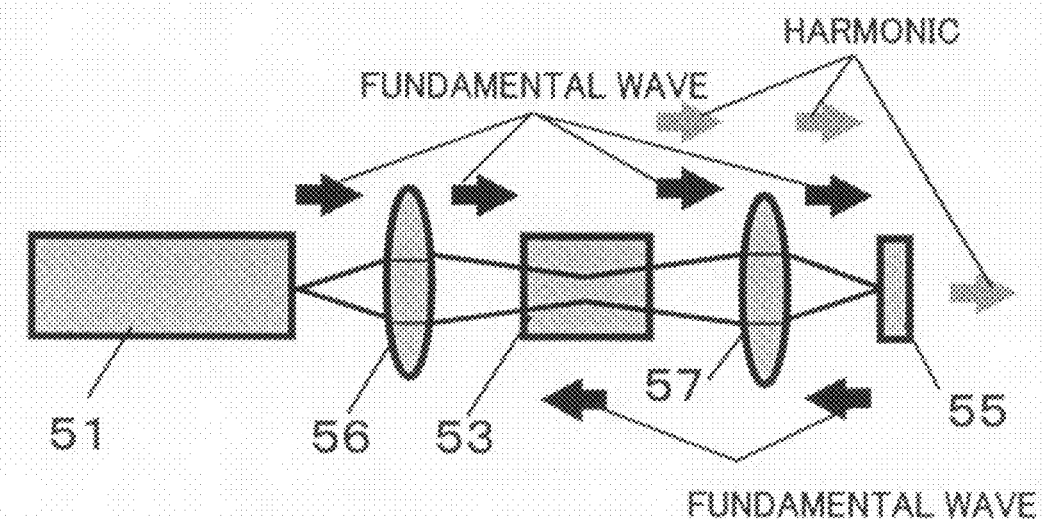
FIG. 11 is a block diagram showing a schematic structure of another conventional wavelength conversion apparatus.

FIG. 9 is a block diagram showing an exemplary structure of a two-dimensional image display apparatus (laser display) according to a second embodiment of the present invention. As shown in FIG. 9, red (R), green (G) and blue (B) laser light sources 21a, 21b and 21c are used as light sources. As the R light source 21a, an AlGaInP/GaAs-system semiconductor laser of a wavelength of 638 nm is used; and as the B light source 21c, a GaN-system semiconductor laser of a wavelength of 465 nm is used. As the G light source 21b, the wavelength conversion apparatus according to the first embodiment is used. Laser beams emitted from the R, G, and B light sources 21a, 21b and 21c are respectively collected by collection lenses 22a, 22b and 22c and then are caused to scan diffusion plates 25a, 25b and 25c by two-dimensional beam scanning means 23a, 23b and 23c.

Image data is divided into R data, G data and B data. Signals respectively regarding the R data, the G data and the B data are focused by field lenses 26a, 26b and 26c and input to spatial optical modulation elements 27a, 27b and 27c. Then, the signals are combined by a dichroic prism 28 to form a color image. A beam for the color image is projected on a screen 31 after passing through projection lenses 20 and 30. On an optical path for allowing the beam from the G light source 21b to be incident on the spatial optical modulation element 27b, a concave lens 24 is inserted in order to make the spot size of the G light at the spatial optical modulation element 27b equal to those of the R light and the B light.

Thus, the two-dimensional image display apparatus according to the second embodiment of the present invention uses laser light sources as the R, G and B light sources, so as to be high in luminance and thin in structure. By using the wavelength conversion apparatus according to the first embodiment as the G light source, the efficiency of outputting the G light is increased to provide a high luminance image. The increased efficiency provides the following effects. For example, the fiber laser may be shortened to reduce the cost, or the light amount of the excitation light source may be decreased to reduce the power consumption. The two-dimensional image display apparatus according to the second embodiment of the present invention may be provided in the form of a rear projection display for projecting an image from the rear side of the screen, as well as the laser display described above.

A wavelength conversion apparatus according to the present invention is usable as a high output visible-light source or the like, and is applicable to a display or the like.

While the invention has been described in detail, the foregoing description is in all aspects illustrative and not restrictive. It is understood that numerous other modifications and variations can be devised without departing from the scope of the invention.

What is claimed is:

1. A wavelength conversion apparatus, comprising:
   an end pump fiber laser for generating a fundamental wave, the end pump fiber laser containing a laser activating substance, and including a reflecting surface at one end thereof and a fiber grating in the vicinity of the reflecting surface;
   an excitation laser light source for outputting excitation laser light;
   an excitation laser light introduction section for introducing the excitation laser light from the excitation laser light source to the end pump fiber laser from an end surface of the end pump fiber laser opposite to the reflecting surface;
   a wavelength conversion element for partially converting the fundamental wave generated by the fiber laser to a harmonic; and
   a rear reflecting surface located outside the end pump fiber laser and forming a laser cavity together with the fiber grating, wherein:
   the wavelength conversion element is located between the fiber grating and the rear reflecting surface;
   the rear reflecting surface reflects the fundamental wave transmitted through the wavelength conversion element and outputs the harmonic obtained by the wavelength conversion element;
   the wavelength conversion element partially converts the fundamental wave reflected by the rear reflecting surface into the harmonic; and
   the reflecting surface at the end of the end pump fiber laser reflects the fundamental wave.

2. A wavelength conversion apparatus according to claim 1, wherein:
   the reflecting surface at the end of the end pump fiber laser reflects both the excitation laser light and the harmonic.

3. A wavelength conversion apparatus according to claim 1, further comprising a harmonic output section between an outgoing end surface of the end pump fiber laser and the wavelength conversion element;
   wherein the harmonic output section outputs the harmonic generated from the fundamental wave reflected by the rear reflecting surface.

4. A wavelength conversion apparatus according to claim 3, wherein the harmonic output section is a coating for reflecting the harmonic, which is provided on an end surface of the wavelength conversion element closer to the end pump fiber laser.

5. A wavelength conversion apparatus according to claim 3, wherein the harmonic output section is a coating for reflecting the harmonic, which is provided on the excitation laser light introduction section.

6. A wavelength conversion apparatus according to claim 1, wherein the rear reflecting surface is a dichroic mirror and is adjustable to rotate around an X axis and a Y axis where a Z axis is in an optical axis direction.

7. A wavelength conversion apparatus according to claim 1, wherein the rear reflecting surface is a coating provided on an incidence end surface of a fiber for collecting the harmonic generated by the wavelength conversion element, and the incidence end surface of the fiber is adjustable to rotate around an X axis and a Y axis where a Z axis is in an optical axis direction.

8. A wavelength conversion apparatus according to claim 1, wherein an outgoing end surface of the end pump fiber laser is cut such that a propagation direction of the fundamental wave going out from the end pump fiber laser forms a Brewster's angle with respect to a direction vertical to the outgoing end surface of the end pump fiber laser.

9. A wavelength conversion apparatus according to claim 8, wherein the end pump fiber laser is a single-mode fiber with no polarization-maintaining function.

10. A two-dimensional image display apparatus, comprising:
    a screen; and
    a plurality of laser light sources;
    wherein:
    the laser light sources respectively emit at least red light, green light and blue light; and
    at least the light source emitting the green light is the wavelength conversion apparatus according to claim 1.

* * * * *